US010308741B2

(12) United States Patent
Demirors et al.

(10) Patent No.: US 10,308,741 B2
(45) Date of Patent: *Jun. 4, 2019

(54) MONO- AND MULTI-LAYER FILMS AND ARTICLES MADE THEREFROM

(71) Applicant: Dow Global Technologies LLC, Midland, MI (US)

(72) Inventors: Mehmet Demirors, Pearland, TX (US); Teresa P. Karjala, Lake Jackson, TX (US); Nilesh R. Savargaonkar, Pearland, TX (US); Rajen M. Patel, Lake Jackson, TX (US); Sylvie Desjardins, Lake Jackson, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 373 days.

This patent is subject to a terminal disclaimer.

(21) Appl. No.: 14/175,264

(22) Filed: Feb. 7, 2014

(65) Prior Publication Data

US 2014/0178614 A1 Jun. 26, 2014

Related U.S. Application Data

(63) Continuation-in-part of application No. 14/116,070, filed as application No. PCT/US2012/039140 on May 23, 2012, now Pat. No. 9,255,160.

(60) Provisional application No. 61/491,924, filed on Jun. 1, 2011.

(51) Int. Cl.
*C08F 210/16* (2006.01)

(52) U.S. Cl.
CPC ....... *C08F 210/16* (2013.01); *Y10T 428/1334* (2015.01)

(58) Field of Classification Search
CPC .................. C08F 210/16; Y10T 428/1336
USPC .................................................. 526/352, 114
See application file for complete search history.

(56) References Cited

U.S. PATENT DOCUMENTS

| | | | |
|---|---|---|---|
| 4,120,820 A | 10/1978 | Birkelbach | |
| 4,224,186 A | 9/1980 | Lowery, Jr. et al. | |
| 4,308,369 A | 12/1981 | Shipley et al. | |
| 4,380,508 A | 4/1983 | Shipley et al. | |
| 4,399,053 A | 8/1983 | Shipley et al. | |
| 4,409,126 A | 10/1983 | Shipley et al. | |
| 5,032,562 A | 7/1991 | Lo et al. | |
| 5,032,632 A | 7/1991 | Lo et al. | |
| 6,054,406 A | 4/2000 | Smith | |
| 6,225,424 B1* | 5/2001 | Nishikawa | C08F 10/02 428/35.7 |
| 6,433,119 B1 | 8/2002 | Smith | |
| 7,081,285 B1* | 7/2006 | Barre | C08F 210/16 428/35.2 |
| 7,473,664 B2 | 1/2009 | Vizzini et al. | |
| 2002/0016255 A1 | 2/2002 | Job | |
| 2010/0119793 A1* | 5/2010 | Desjardins | C08F 210/16 428/219 |

FOREIGN PATENT DOCUMENTS

| | | |
|---|---|---|
| EP | 0692498 | 1/1996 |
| FR | 2672606 | 8/1992 |
| WO | 2004018529 | 3/2004 |
| WO | 2012084920 | 6/2012 |

OTHER PUBLICATIONS

EP Office Action dated Oct. 9, 2014; from EP counterpart Application No. 12726961.1.
Japanese Office Action dated Mar. 1, 2016; from Japanese counterpart Application No. 2014-513571.
T. Williams and I.M. Ward, The Construction of Polyethylene Calibration Curve for Gel Permeation Chromatography Using Polystyrene Fractions, J. Polym. Sci. Lett., Sep. 1968, vol. 6, pp. 621-624.
Chinese Response to Office Action dated Nov. 5, 2015; from Chinese counterpart Application No. 201280024766.2.
European Patent Office Summons to Attend Oral Proceedings Pursuant to Rule 115(1) EPC dated Jul. 30, 2015 for EPO Application No. 12726961.1, 4 pages.
Chinese First Office Action dated May 25, 2015 for Chinese Application No. 201280024766.2, 7 pages.
Japanese Office Action dated Dec. 20, 2016; from counterpart Japanese Application No. 2014-513571.

\* cited by examiner

*Primary Examiner* — William K Cheung
(74) *Attorney, Agent, or Firm* — Dinsmore & Shohl LLP

(57) ABSTRACT

Mono- and multi-layer films comprising a polyethylene composition which comprises the reaction product of ethylene and optionally one or more alpha olefin comonomers in the presence of a catalyst composition comprising a multi-metallic procatalyst via a solution polymerization process in at least one reactor; wherein said polyethylene composition is characterized by one or more of the following properties: a melt index, $I_2$, measured according to ASTM D 1238 (2.16 kg@190° C.), from 0.1 to 5 g/10 min; density, measured according to ASTM D-792, from 0.910 to 0.935 g/cc; melt flow ratio, $I_{10}/I_2$, wherein $I_{10}$ is measured according to ASTM D1238 (10 kg@190° C.), from 6 to 7.4; and molecular weight distribution, ($M_w/M_n$) from 2.5 to 3.5 are provided. Also provided are articles made from the mono- and/or multi-layer films.

10 Claims, No Drawings

MONO- AND MULTI-LAYER FILMS AND ARTICLES MADE THEREFROM

This application is a continuation-in-part of U.S. application Ser. No. 14/116,070, filed Nov. 6, 2013, now issued as U.S. Pat. No. 9,255,160, which is a national stage entry of PCT Application PCT/US2012/039140, filed May 23, 2012, which claims the benefit of U.S. Provisional Application No. 61/491,924, filed on Jun 1, 2011, the disclosures of which are incorporated herein by reference.

FIELD OF INVENTION

The instant invention relates to mono- and multi-layer films and articles made therefrom.

BACKGROUND OF THE INVENTION

Currently the demand for polyethylene worldwide is in excess of 80 million metric tons per year. Because there is a need for significant and continued differentiation of polymer products in the polyethylene business, researchers have devoted a great deal of effort to searching for process alterations that will yield such new products. One focus involves exploring new catalysts.

Conventional solution polyethylene Ziegler Natta catalysts based on a Ti precursor supported on precipitated $MgCl_2$ yield linear low density polyethylene (LLDPE) resins with broad molecular weight distributions and composition distributions.

In LLDPE production, ethylene is generally copolymerized with a short-chain olefin comonomer (for example, 1-butene, 1-hexene and/or 1-octene). The resulting polymer is substantially linear but includes significant numbers of short chain branches, and these characteristics give it a higher tensile strength, higher impact strength and higher puncture resistance than those of low density polyethylene (LDPE). LLDPE is used predominantly in film applications due to its toughness, flexibility and relative transparency. Product examples range from agricultural films, food protection wrap, and bubble wrap, to multilayer and composite films.

Polyethylene resins with narrowed molecular weight distributions (MWDs) provide enhanced film properties useful in food and specialty packaging (F&SP) applications. Specifically, a combination of good properties related to dart drop impact, 45 degree gloss, and haze are desirable for F&SP films.

SUMMARY OF THE INVENTION

The instant invention is mono- and multi-layer films and articles made therefrom.

In one embodiment, the instant invention provides a mono- or multi-layer film comprising a polyethylene composition which comprises the reaction product of ethylene and optionally one or more alpha olefin comonomers in the presence of a catalyst composition comprising a multi-metallic procatalyst via a solution polymerization process in at least one reactor; wherein said polyethylene composition is characterized by one or more of the following properties: a melt index, $I_2$, measured according to ASTM D 1238 (2.16 kg@190° C.), from 0.1 to 5 g/10 min; density, measured according to ASTM D-792, from 0.910 to 0.935 g/cc; melt flow ratio, $I_{10}/I_2$, wherein $I_{10}$ is measured according to ASTM D1238 (10 kg@190° C.), from 6 to 7.4; and molecular weight distribution, $(M_w/M_n)$ from 2.5 to 3.5.

DETAILED DESCRIPTION OF THE INVENTION

The instant invention includes mono- and multi-layer films and articles made therefrom.

The mono- or multi-layer film according to the present invention comprises a polyethylene composition which comprises the reaction product of ethylene and optionally one or more alpha olefin comonomers in the presence of a catalyst composition comprising a multi-metallic procatalyst via a solution polymerization process in at least one reactor; wherein said polyethylene composition is characterized by one or more of the following properties: a melt index, $I_2$, measured according to ASTM D 1238 (2.16 kg@190° C.), from 0.1 to 5 g/10 min; density, measured according to ASTM D-792, from 0.910 to 0.935 g/cc; melt flow ratio, $I_{10}/I_2$, wherein $I_{10}$ is measured according to ASTM D1238 (10 kg@190° C.), from 6 to 7.4; and molecular weight distribution, $(M_w/M_n)$ from 2.5 to 3.5.

In an alternative embodiment, the instant invention further provides articles made from the mono- and/or multi-layer films disclosed herein.

The catalyst compositions used to prepare the polyethylene compositions (PE) used to make the inventive films herein may be prepared beginning first with preparation of a conditioned magnesium halide based support. Preparation of a conditioned magnesium halide based support begins with selecting an organomagnesium compound or a complex including an organomagnesium compound. Such compound or complex is desirably soluble in an inert hydrocarbon diluent. The concentrations of components are preferably such that when the active halide, such as a metallic or non-metallic halide, and the magnesium complex are combined, the resultant slurry is from about 0.005 to about 0.2 molar (moles/liter) with respect to magnesium. Examples of suitable inert organic diluents include liquefied ethane, propane, isobutane, n-butane, n-hexane, the various isomeric hexanes, isooctane, paraffinic mixtures of alkanes having from 5 to 10 carbon atoms, cyclohexane, methylcyclopentane, dimethylcyclohexane, dodecane, industrial solvents composed of saturated or aromatic hydrocarbons such as kerosene, naphthas, and combinations thereof, especially when freed of any olefin compounds and other impurities, and especially those having boiling points in the range from about −50° C. to about 200° C. Also included as suitable inert diluents are ethylbenzene, cumene, decalin and combinations thereof.

Suitable organomagnesium compounds and complexes may include, for example, magnesium C2-C8 alkyls and aryls, magnesium alkoxides and aryloxides, carboxylated magnesium alkoxides, and carboxylated magnesium aryloxides. Preferred sources of magnesium moieties may include the magnesium C2-C8 alkyls and C1-C4 alkoxides. Such organomagnesium compound or complex may be reacted with a metallic or non-metallic halide source, such as a chloride, bromide, iodide, or fluoride, in order to make a magnesium halide compound under suitable conditions. Such conditions may include a temperature ranging from −25° C. to 100° C., preferably 0° C. to 50° C.; a time ranging from 1 to 12 hours, preferably from 4 to 6 hours; or both. The result is a magnesium halide based support.

The magnesium halide support is then reacted with a selected conditioning compound containing an element selected from the group consisting of boron, aluminum, gallium, indium and tellurium, under conditions suitable to form a conditioned magnesium halide support. This compound and the magnesium halide support are then brought into contact under conditions sufficient to result in a conditioned magnesium halide support. Such conditions may include a temperature ranging from 0° C. to 50° C., preferably from 25° C. to 35° C.; a time ranging from 4 to 24 hours, preferably from 6 to 12 hours; or both. Without wishing to be bound by any theory of mechanism, it is suggested that this aging serves to facilitate or enhance adsorption of additional metals onto the support.

Once the conditioned support is prepared and suitably aged, it is brought into contact with a titanium compound. In certain preferred embodiments titanium halides or alkoxides, or combinations thereof, may be selected. Conditions may include a temperature within the range from 0° C. to 50° C., preferably from 25° C. to 35° C.; a time from 3 hours to 24 hours, preferably from 6 hours to 12 hours; or both. The result of this step is adsorption of at least a portion of the titanium compound onto the conditioned magnesium halide support.

Finally, two additional metals, referred to herein as "the second metal" and "the third metal" for convenience, will also be adsorbed onto the magnesium based support, The "second metal" and the "third metal" are independently selected from zirconium (Zr), hafnium (Hf), vanadium (V), niobium (Nb), tantalum (Ta), chromium (Cr), molybdenum (Mo), and tungsten (W). These metals may be incorporated in any of a variety of ways known to those skilled in the art, but generally contact between the conditioned magnesium based halide support including titanium and the selected second and third metals, in, e.g., liquid phase such as an appropriate hydrocarbon solvent, will be suitable to ensure deposition of the additional metals to form what may now be referred to as the "procatalyst," which is a multi-metallic procatalyst.

The multi-metallic procatalyst has a molar ratio constitution that is specific and which is believed to be an important feature in ensuring the desirable polymer properties that may be attributed to the catalyst made from the procatalyst. Specifically, the procatalyst desirably exhibits a molar ratio of the magnesium to a combination of the titanium and the second and third metals that ranges from 30:1 to 5:1; under conditions sufficient to form a multi-metallic procatalyst. Thus, the overall molar ratio of magnesium to titanium ranges from 8:1 to 80:1.

Once the procatalyst has been formed, it may be used to form a final catalyst by combining it with a cocatalyst consisting of at least one organometallic compound such as an alkyl or haloalkyl of aluminum, an alkylaluminum halide, a Grignard reagent, an alkali metal aluminum hydride, an alkali metal borohydride, an alkali metal hydride, an alkaline earth metal hydride, or the like. The formation of the final catalyst from the reaction of the procatalyst and the organometallic cocatalyst may be carried out in situ, or just prior to entering the polymerization reactor. Thus, the combination of the cocatalyst and the procatalyst may occur under a wide variety of conditions. Such conditions may include, for example, contacting them under an inert atmosphere such as nitrogen, argon or other inert gas at temperatures in the range from 0° C. to 250° C., preferably from 15° C. to 200° C. In the preparation of the catalytic reaction product, it is not necessary to separate hydrocarbon soluble components from hydrocarbon insoluble components. Time for contact between the procatalyst and cocatalyst may desirably range, for example, from 0 to 240 seconds, preferably from 5 to 120 seconds. Various combinations of these conditions may be employed.

Once the catalyst compositions of the invention have been prepared, they are suitable to use for olefin polymerizations. In particular embodiments these are slurry (wherein the polymer is not dissolved in the carrier) or solution (wherein the temperature is high enough to solubilize the polymer in the carrier) polymerizations, or the like, to prepare LLDPE. In general this may be carried out generally in a reaction medium, such as an isoparaffin or other aliphatic hydrocarbon diluents, with the olefin, or a combination of olefins, being brought into contact with the reaction medium in the presence of the selected catalyst, preferably as the sole catalyst. Conditions may be any that are suitable, and a molecular weight regulator, frequently hydrogen, is often present in the reaction vessel in order to suppress formation of undesirably high molecular weight polymers.

The polymers of the present invention can be homopolymers of C2-C20 alpha-olefins, such as ethylene, propylene, or 4-methyl-1-pentene, or they may be interpolymers of ethylene or propylene with at least one or more alpha-olefins and/or C2-C20 acetylenically unsaturated monomers and/or C4-C18 diolefins. They may also be interpolymers of ethylene with at least one of the above C3-C20 alpha-olefins, diolefins and/or acetylenically unsaturated monomers in combination with other unsaturated monomers. Those skilled in the art will understand that selected monomers are desirably those that do not destroy conventional Ziegler-Natta catalysts. For example, in one embodiment ethylene or a mixture of ethylene and from about 0.1 to about 20 weight percent (wt %), for example, from about 0.1 to about 15 wt %, or in the alternative, from about 0.1 to about 10 wt %; or in the alternative, from 0.1 to about 5 weight percent of 1-hexene, 1-octene, or a similar higher α-olefin, based on total monomer in the final copolymer, may be successfully polymerized using the inventive process.

In the polymerization process employing the aforementioned catalytic reaction product, polymerization is effected by adding a catalytic amount of the inventive catalyst composition to a polymerization reactor containing the selected α-olefin monomer, or vice versa. The polymerization reactor is maintained at temperatures in the range from 150° C. to 300° C., preferably at solution polymerization temperatures, e.g., from 150° C. to 250° C., for a residence time, in certain non-limiting embodiments, ranging from 5 minutes to 20 minutes. Longer or shorter residence times may alternatively be employed. It is generally desirable to carry out the polymerization in the absence of moisture and oxygen and in the presence of a catalytic amount of the catalytic reaction product that is typically within the range from 0.0001 to about 0.01 milligram-atoms transition metal per liter of diluent. It is understood, however, that the most advantageous catalyst concentration will depend upon polymerization conditions such as temperature, pressure, solvent and the presence of catalyst poisons and that the foregoing range is given for illustrative purposes of one particular but non-limiting embodiment only.

For example, pressures may be relatively low, e.g., from 150 to 3,000 psig (1.0 to 20.7 MPa), preferably from 250 to 1,000 psig (1.7 to 6.9 MPa), most preferably from 450 to 800 psig (3.1 to 5.5 MPa). However, polymerization within the scope of the invention can occur at pressures from atmospheric up to pressures determined by the capabilities of the polymerization equipment.

Generally in the polymerization process, a carrier which may be an inert organic diluent or solvent or excess monomer is generally employed. Generally care is desirably taken to avoid oversaturation of the solvent with polymer. If such saturation occurs before the catalyst becomes depleted, the full efficiency of the catalyst may not be realized. In particular embodiments, it may be preferable that the amount of polymer in the carrier not exceed 30 percent, based on the total weight of the reaction mixture. It may also be very desirable to stir the polymerization components in order to attain desirable levels of temperature control and to enhance the uniformity of the polymerization throughout the polymerization zone. For example, in the case of relatively more rapid reactions with relatively active catalysts, means may be provided for refluxing monomer and diluent, if diluent is included, thereby removing some of the heat of reaction. In any event, adequate means should be provided for dissipating the exothermic heat of polymerization. Thus, polymerization may be effected in a batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

In order to enhance catalyst efficiency in the polymerization of ethylene, it may also be desirable to maintain a certain ethylene concentration in the diluents in order to ensure reactor stability and, preferably, optimize catalyst efficiency. In some embodiments this may include a ratio of solvent to ethylene ranging from 1:2 to 1:8, preferably 1:3 to 1:5. To achieve this when an excess of ethylene is fed into the system, a portion of the ethylene can be vented.

Hydrogen is often employed in the practice of this invention, for the purpose of lowering the molecular weight of the resultant polymer. For the purpose of the invention, it is beneficial to employ hydrogen in the polymerization mixture in concentrations ranging preferably from 0.001 to 1 mole per mole of monomer. The larger amounts of hydrogen within this range may be useful to produce generally lower molecular weight polymer. It is generally known to those skilled in the art that hydrogen may be added to the polymerization vessel either with a monomer stream, or separately therefrom, before, during or after addition of the monomer to the polymerization vessel. However, in preferred embodiments it is highly desirable to ensure that the hydrogen is added either before or during addition of the catalyst, in the range of from 200,000 to 3 million grams of polymer per gram of Ti, such as, for example, from 600,000 to 2 million grams of polymer per gram of Ti.

The resulting polymer may be effectively recovered from the polymerization mixture by driving off unreacted monomer and diluent, where such is employed. No further removal of impurities is required. The resultant polymer may contain small amounts of catalyst residue as shown in the succeeding examples and also possess a relatively narrow molecular weight distribution. The resulting polymer may further be melt screened. Subsequent to the melting process in the extruder, the molten composition is passed through one or more active screens, positioned in series of more than one, with each active screen having a micron retention size of from about 2 μm to about 400 μm (2 to $4 \times 10^{-5}$ m), and preferably about 2 μm to about 300 μm (2 to $3 \times 10^{-5}$ m), and most preferably about 2 μm to about 70 μm (2 to $7 \times 10^{-6}$ m), at a mass flux of about 5 to about 100 lb/hr/in$^2$ (1.0 to about 20 kg/s/m$^2$). Such further melt screening is disclosed in U.S. Pat. No. 6,485,662, which is incorporated herein by reference to the extent that it discloses melt screening.

The polyethylene composition may comprise less than 20 percent by weight of units derived from one or more α-olefin comonomers. All individual values and subranges from less than 20 weight percent are included herein and disclosed herein; for example, the polyethylene composition may comprise less than 15 percent by weight of units derived from one or more α-olefin comonomers; or in the alternative, the polyethylene composition may comprise less than 12 percent by weight of units derived from one or more α-olefin comonomers; or in the alternative, the polyethylene composition may comprise less than 9 percent by weight of units derived from one or more α-olefin comonomers; or in the alternative, the polyethylene composition may comprise less than 7 percent by weight of units derived from one or more α-olefin comonomers; or in the alternative, the polyethylene composition may comprise less than 5 percent by weight of units derived from one or more α-olefin comonomers; or in the alternative, the polyethylene composition may comprise less than 3 percent by weight of units derived from one or more α-olefin comonomers; or in the alternative, the polyethylene composition may comprise less than 1 percent by weight of units derived from one or more α-olefin comonomers; or in the alternative, the polyethylene composition may comprise less than 0.5 percent by weight of units derived from one or more α-olefin comonomers.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may be selected, for example, from the group consisting of propylene, 1-butene, 1-hexene, and 1-octene; or in the alternative, from the group consisting of 1-hexene and 1-octene.

The polyethylene composition may comprise at least 80 percent by weight of units derived from ethylene. All individual values and subranges from at least 80 weight percent are included herein and disclosed herein; for example, the polyethylene composition may comprise at least 85 percent by weight of units derived from ethylene; or in the alternative, the polyethylene composition may comprise at least 89 percent by weight of units derived from ethylene; or in the alternative, the polyethylene composition may comprise at least 91 percent by weight of units derived from ethylene; or in the alternative, the polyethylene composition may comprise at least 93 percent by weight of units derived from ethylene; or in the alternative, the polyethylene composition may comprise at least 95 percent by weight of units derived from ethylene; or in the alternative, the polyethylene composition may comprise at least 97 percent by weight of units derived from ethylene; or in the alternative, the polyethylene composition may comprise at least 99 percent by weight of units derived from ethylene; or in the alternative, the polyethylene composition may comprise at least 99.5 percent by weight of units derived from ethylene.

In a particular embodiment, the polyethylene composition may further comprise greater than or equal to 1 parts by combined weight of at least three metal residues remaining from the multi-metallic polymerization catalyst per one million parts of polyethylene composition, where such metals are selected from the group consisting of titanium, zirconium, hafnium, vanadium, niobium, tantalum, chromium, molybdenum, tungsten, and combinations thereof, wherein each metal residual is present at least 0.2 ppm, for example, in the range of from 0.2 to 5 ppm. All individual values and subranges from greater than or equal to 1 ppm are included herein and disclosed herein; for example, the polyethylene composition may further comprise greater than or equal to 2 parts by combined weight of at least three metal residues remaining from the multi-metallic polymerization catalyst per one million parts of polyethylene composition.

The polyethylene composition may further comprise additional components such as other polymers and/or additives. Such additives include, but are not limited to, antistatic agents, color enhancers, dyes, lubricants, fillers, pigments, primary antioxidants, secondary antioxidants, processing aids, UV stabilizers, and combinations thereof. The polyethylene composition may contain any amounts of additives. The polyethylene composition may comprise from about 0 to about 10 percent by the combined weight of such additives, based on the weight of the polyethylene composition including such additives. All individual values and subranges from about 0 to about 10 weight percent are included herein and disclosed herein; for example, the polyethylene composition may comprise from 0 to 7 percent by the combined weight of additives, based on the weight of the polyethylene composition including such additives; in the alternative, the polyethylene composition may comprise from 0 to 5 percent by the combined weight of additives, based on the weight of the polyethylene composition including such additives; or in the alternative, the polyethylene composition may comprise from 0 to 3 percent by the combined weight of additives, based on the weight of the polyethylene composition including such additives; or in the alternative, the polyethylene composition may comprise from 0 to 2 percent by the combined weight of additives, based on the weight of the polyethylene composition including such additives; or in the alternative, the polyethylene composition may comprise from 0 to 1 percent by the combined weight of additives, based on the weight of the polyethylene composition including such additives; or in the alternative, the polyethylene composition may comprise from 0 to 0.5 percent by the combined weight of additives, based on the weight of the polyethylene composition including such additives. Antioxidants, such as IRGAFOS168 and IRGANOX1010, may be used to protect the polyethylene composition from thermal and/or oxidative degradation. IRGANOX 1010 is tetrakis(methylene(3,5-di-tert-butyl-4hydroxyhydrocinnamate) available from BASF. IRGAFOS168 is tris(2,4 di-tert-butylphenyl)phosphite available from BASF.

Any conventional ethylene (co)polymerization reaction may be employed to produce the polyethylene composition. Such conventional ethylene (co)polymerization reactions include, but are not limited to, slurry phase polymerization process, solution phase polymerization process, and combinations thereof using one or more conventional reactors, e.g., loop reactors, stirred tank reactors, batch reactors in parallel, series, and/or any combinations thereof. In one embodiment, the polymerization reactor may comprise two or more reactors in series, parallel, or combinations thereof. In one embodiment, the polymerization reactor is one reactor.

The polymers produced hereby may include a wide variety of products including, in particular embodiments, LLDPE, but also high density polyethylenes (HDPE), plastomers, medium density polyethylenes, propypropylene and polypropylene copolymers. For these and other applications articles may be prepared showing enhanced overall quality due to the narrower molecular weight distribution of the polymer. Useful forming operations for the polymers may include, but are not limited to, film, sheet, pipe and fiber extrusion and co-extrusion as well as blow molding, injection molding and rotary molding may be pursued. Films include blown or cast films formed by co-extrusion or by lamination useful as shrink film, cling film, stretch film, sealing film, oriented film, meat and cheese packaging, liquid packaging, snack packaging, heavy duty bags, grocery sacks, baked and frozen food packaging, medical packaging, industrial liners, agricultural film applications, and membranes, for example, in food-contact and non-food-contact applications. Fibers include melt spinning, solution spinning and melt blown fiber operations for use in woven and non-woven form to make filters, diaper fabrics, medical garments and geotextiles. Extruded articles include medical tubing, wire and cable coatings, geomembranes and pond liners. Molded articles include single and multi-layered constructions in the form of bottles, tanks, large hollow articles, rigid food containers and toys.

The films according to the present invention comprises a polyethylene composition which is characterized by one or more of the following properties: a melt index, $I_2$, measured according to ASTM D 1238 (2.16 kg@190° C.), from 0.1 to 5 g/10 min; density, measured according to ASTM D-792, from 0.910 to 0.935 g/cc; melt flow ratio, $I_{10}/I_2$, wherein $I_{10}$ is measured according to ASTM D1238 (10 kg@190° C.), from 6 to 7.4; and molecular weight distribution, $(M_w/M_n)$ from 2.5 to 3.5.

All individual values and subranges of a melt index, $I_2$, from 0.1 to 5 g/10 min are included herein and disclosed herein; for example the melt index can be from a lower limit of 0.1, 0.5, 1, 1.5, 2, 2.5, 3, 3.5, 4 or 4.5 g/10 min to an upper limit of 0.2, 0.6, 1.1, 1.6, 2.1, 2.7, 3.2, 3.8, 4.5, or 5 g/10 min. For example, the melt index of the polyethylene composition can be from 0.1 to 5 g/10 min, or in the alternative, the melt index of the polyethylene composition can be from 0.1 to 2.5 g/10 min, or in the alternative, the melt index of the polyethylene composition can be from 2.5 to 5 g/10 min, or in the alternative, the melt index of the polyethylene composition can be from 0.2 to 2.5 g/10 min, or in the alternative, the melt index of the polyethylene composition can be from 1.5 to 3.5 g/10 min.

All individual values and subranges of a density from 0.910 to 0.935 g/cc are included herein and disclosed herein; for example, the density can be from a lower limit of 0.910, 0.915, 0.92, 0.925, or 0.93 to an upper limit of 0.915, 0.92, 0.925, 0.93, or 0.935 g/cc. For example, the density of the polyethylene composition can be from 0.910 to 0.935 g/cc, or in the alternative, the density of the polyethylene composition can be from 0.910 to 0.92 g/cc, or in the alternative, the density of the polyethylene composition can be from 0.920 to 0.935 g/cc, or in the alternative, the density of the polyethylene composition can be from 0.915 to 0.925 g/cc.

All individual values and subranges of the melt flow ratio from 6 to 7.4 are included herein and disclosed herein; for example, the melt flow ratio can be from a lower limit of 6, 6.2, 6.4, 6.6. 6.8, 7, or 7.2 to an upper limit of 6.1, 6.3, 6.5, 6.7, 6.9, 7.1, 7.3 or 7.4. For example, the melt flow ratio can be from 6 to 7.4, or in the alternative, the melt flow ratio can be from 6 to 6.7, or in the alternative, the melt flow ratio can be from 6.6 to 7.4, or in the alternative, the melt flow ratio can be from 6.3 to 7, or in the alternative, the melt flow ratio can be from 6 to 7.2.

All individual values and subranges of the molecular weight distribution, $(M_w/M_n)$ from 2.5 to 3.5 are included herein and disclosed herein; for example, the molecular weight distribution can be from a lower limit of 2.5, 2.7, 2.9 3.1 or 3.3 to an upper limit of 2.6, 2.8, 3.0, 3.2, 3.4 or 3.5. For example, the molecular weight distribution can be from 2.5 to 3.5, or in the alternative, the molecular weight distribution can be from 2.75 to 3.5, or in the alternative, the molecular weight distribution can be from 2.5 to 3, or in the alternative, the molecular weight distribution can be from 2.75 to 3.25, or in the alternative, the molecular weight distribution can be from 2.5 to 3.4.

In an alternative embodiment, the instant invention provides a film comprising the polyethylene composition according to any embodiment disclosed herein.

In another embodiment, the instant invention provides a film in accordance with any embodiment disclosed herein except that the solution polymerization occurs in a single reactor.

In another embodiment, the instant invention provides a film in accordance with any embodiment disclosed herein except that the solution polymerization occurs in a dual reactor system wherein the same polymer is made in each of the dual reactors.

In a particular embodiment, the film is a mono-layer film. In an alternative embodiment, the film is a multi-layer film.

In a particular embodiment, the instant invention provides a mono-layer film according to any embodiment disclosed herein except that the film has a thickness from 0.8 to 10 mils. All individual values and subranges from 0.8 to 10 mils are included herein and disclosed herein; for example, the thickness of the mono-layer film can be from a lower limit of 0.8, 2, 4, 6, or 8 mils to an upper limit of 1, 3, 5, 7, 9 or 10 mils. For example, the thickness of the mono-layer film can be from 0.8 to 10 mils, or in the alternative, the thickness of the mono-layer film can be from 1 to 7 mils, or in the alternative, the thickness of the mono-layer film can be from 1.5 to 5 mils, or in the alternative, the thickness of the mono-layer film can be from 1 to 3 mils, or in the alternative, from 5 to 10 mils.

In a particular embodiment, the instant invention provides a multi-layer film according to any embodiment disclosed herein except that multi-layer film comprises at least one layer, having a thickness from 0.3 to 8 mils, made from a polyethylene composition which comprises the reaction product of ethylene and optionally one or more alpha olefin comonomers in the presence of a catalyst composition comprising a multi-metallic procatalyst via a solution polymerization process in at least one reactor; wherein said polyethylene composition is characterized by one or more of the following properties: (a) a melt index, $I_2$, measured according to ASTM D 1238 (2.16 kg@190° C.), from 0.1 to 5 g/10 min; (b) density, measured according to ASTM D-792, from 0.910 to 0.935 g/cc; (c) melt flow ratio, $I_{10}/I_2$, wherein $I_{10}$ is measured according to ASTM D1238 (10 kg@190° C.), from 6 to 7.4; and (d) molecular weight distribution, ($M_w/M_n$) from 2.5 to 3.5. All individual values and subranges from 0.3 to 8 mils thickness are included herein and disclosed herein; for example, the thickness of the at least one layer can be from a lower limit of 0.3, 1, 4, or 7 mils to an upper limit of 0.5, 2, 5, or 8 mils. For example, the thickness of the at least one layer may be from 0.3 to 8 mils, or in the alternative, the thickness of the at least one layer may be from 0.3 to 5 mils, or in the alternative, the thickness of the at least one layer may be from 0.3 to 0.5 mils, or in the alternative, the thickness of the at least one layer may be from 0.3 to 1 mils, or in the alternative, the thickness of the at least one layer may be from 0.4 to 4 mils, or in the alternative, the thickness of the at least one layer may be from 0.4 to 3 mils.

In a particular embodiment, the instant invention provides a monolayer film having a gauge of 2 mils and wherein the film exhibits one or more of the following properties: dart drop impact of at least 450 g, measured as described herein; 45 degree gloss greater than 57%, measured as described herein; and total haze equal to or less than 13%, measured as described herein. All individual values and subranges of dart drop impact from at least 450 g are included herein and disclosed herein; for example, the dart drop impact can be from a lower limit of 450, 475, 500, 525 or 550 g. In particular embodiments, the dart drop impact has an upper limit of 475, 575, 675, 775, 875, 975 or 1000 g. For example, the dart drop impact of the mono-layer film can be from 450 to 625 g, or in the alternative, the dart drop impact of the mono-layer film can be from 500 to 750 g, or in the alternative, the dart drop impact of the mono-layer film can be from 450 to 800 g, or in the alternative, the dart drop impact of the mono-layer film can be from 475 to 1000 g.

All individual values and subranges of 45 degree gloss greater than 57% are included herein and disclosed herein. For example, the 45 degree gloss of the mono-layer film can be greater than 57%, or in the alternative, the 45 degree gloss of the mono-layer film can be greater than 59%, or in the alternative, the 45 degree gloss of the mono-layer film can be greater than 61%. In particular embodiments, the 45 degree gloss has an upper limit of 98, 90, 82, or 76%.

All individual values and subranges of total haze of equal to or less than 13% are included herein and disclosed herein; for example, the total haze can be from a an upper limit of 5, 9, 10, 11, 12 or 13%. In a particular embodiment, the total haze has a lower limit of 1, 3, 5, 7, 9 or 11%. For example, the total haze of the mono-layer film can be from 1 to 13%, or in the alternative, the total haze of the mono-layer film can be from 5 to 13%, or in the alternative, the total haze of the mono-layer film can be from 1 to 9%.

In yet another embodiment, the instant invention provides an article made from any embodiment of the film disclosed herein. In a particular embodiment, the article is selected from the group consisting of bags, pouches, lamination films, and thermoformed webs.

In another embodiment, the instant invention provides a film or article in accordance with any of the embodiments described herein except that the film comprises a polyethylene composition which comprises the reaction product of ethylene and optionally one or more alpha olefin comonomers in the presence of a catalyst composition consisting essentially of a multi-metallic procatalyst in a solution polymerization process in one or more reactors.

In yet another embodiment, the instant invention provides a film comprising a polyethylene composition which comprises the reaction product of ethylene and optionally one or more alpha olefin comonomers in the presence of a catalyst composition comprising a multi-metallic procatalyst via a solution polymerization process in at least one reactor; wherein said polyethylene composition is characterized by two or more of the following properties: (a) a melt index, $I_2$, measured according to ASTM D 1238 (2.16 kg@190° C.), from 0.1 to 5 g/10 min; (b) density, measured according to ASTM D-792, from 0.910 to 0.935 g/cc; (c) melt flow ratio, $I_{10}/I_2$, wherein $I_{10}$ is measured according to ASTM D1238 (10 kg@190° C.), from 6 to 7.4; and (d) molecular weight distribution, ($M_w/M_n$) from 2.5 to 3.5.

In yet another embodiment, the instant invention provides a film comprising a polyethylene composition which comprises the reaction product of ethylene and optionally one or more alpha olefin comonomers in the presence of a catalyst composition comprising a multi-metallic procatalyst via a solution polymerization process in at least one reactor; wherein said polyethylene composition is characterized by three or more of the following properties: (a) a melt index, $I_2$, measured according to ASTM D 1238 (2.16 kg@190° C.), from 0.1 to 5 g/10 min; (b) density, measured according to ASTM D-792, from 0.910 to 0.935 g/cc; (c) melt flow ratio, $I_{10}/I_2$, wherein $I_{10}$ is measured according to ASTM D1238 (10 kg@190° C.), from 6 to 7.4; and (d) molecular weight distribution, $(M_w/M_n)$ from 2.5 to 3.5.

In yet another embodiment, the instant invention provides a film comprising a polyethylene composition which comprises the reaction product of ethylene and optionally one or more alpha olefin comonomers in the presence of a catalyst composition comprising a multi-metallic procatalyst via a solution polymerization process in at least one reactor; wherein said polyethylene composition is characterized by all of the following properties: (a) a melt index, $I_2$, measured according to ASTM D1238 (2.16 kg@190° C.), from 0.1 to 5 g/10 min; (b) density, measured according to ASTM D-792, from 0.910 to 0.935 g/cc; (c) melt flow ratio, $I_{10}/I_2$, wherein $I_{10}$ is measured according to ASTM D1238 (10 kg@190° C.), from 6 to 7.4; and (d) molecular weight distribution, $(M_w/M_n)$ from 2.5 to 3.5.

In yet another embodiment, the instant invention provides a film comprising a polyethylene composition which comprises the reaction product of ethylene and optionally one or more alpha olefin comonomers in the presence of a catalyst composition consisting essentially of a multi-metallic procatalyst via a solution polymerization process in at least one reactor; wherein said polyethylene composition is characterized by one or more of the following properties: (a) a melt index, $I_2$, measured according to ASTM D 1238 (2.16 kg@190° C.), from 0.1 to 5 g/10 min; (b) density, measured according to ASTM D-792, from 0.910 to 0.935 g/cc; (c) melt flow ratio, $I_{10}/I_2$, wherein $I_{10}$ is measured according to ASTM D1238 (10 kg@190° C.), from 6 to 7.4; and (d) molecular weight distribution, $(M_w/M_n)$ from 2.5 to 3.5.

EXAMPLES

The following examples illustrate the present invention but are not intended to limit the scope of the invention.

General Description of Preparation of Catalysts

The catalyst compositions may be prepared beginning first with preparation of a conditioned magnesium halide based support. Preparation of a conditioned magnesium halide based support begins with selecting an organomagnesium compound or a complex including an organomagnesium compound. Such compound or complex is desirably soluble in an inert hydrocarbon diluent. In one embodiment, the concentrations of components are such that when the active halide, such as a metallic or non-metallic halide, and the magnesium complex are combined, the resultant slurry is from about 0.005 to about 0.3 molar (moles/liter) with respect to magnesium. Examples of suitable inert organic diluents include liquefied ethane, propane, isobutane, n-butane, n-hexane, the various isomeric hexanes, isooctane, paraffinic mixtures of alkanes having from 5 to 10 carbon atoms, cyclohexane, methylcyclopentane, dimethylcyclohexane, dodecane, industrial solvents composed of saturated or aromatic hydrocarbons such as kerosene, naphthas, and combinations thereof, especially when freed of any olefin compounds and other impurities, and especially those having boiling points in the range from about −50° C. to about 200° C. Also included as suitable inert diluents are ethylbenzene, cumene, decalin and combinations thereof.

Suitable organomagnesium compounds and complexes may include, for example, magnesium C2-C8 alkyls and aryls, magnesium alkoxides and aryloxides, carboxylated magnesium alkoxides, and carboxylated magnesium aryloxides. Preferred sources of magnesium moieties may include the magnesium C2-C8 alkyls and C1-C4 alkoxides. Such organomagnesium compound or complex may be reacted with a metallic or non-metallic halide source, such as a chloride, bromide, iodide, or fluoride, in order to make a magnesium halide compound under suitable conditions. Such conditions may include a temperature ranging from −25° C. to 100° C., or alternatively, 0° C. to 50° C.; a time ranging from 1 to 12 hours, or alternatively, from 4 to 6 hours; or both. The result is a magnesium halide based support.

The magnesium halide support is then reacted with a selected conditioning compound containing an element selected from the group consisting of boron, aluminum, gallium, indium and tellurium, under conditions suitable to form a conditioned magnesium halide support. This compound and the magnesium halide support are then brought into contact under conditions sufficient to result in a conditioned magnesium halide support. Such conditions may include a temperature ranging from 0° C. to 50° C., or alternatively, from 25° C. to 35° C.; a time ranging from 4 to 24 hours, or alternatively, from 6 to 12 hours; or both. Without wishing to be bound by any theory of mechanism, it is suggested that this aging serves to facilitate or enhance adsorption of additional metals onto the support.

Once the conditioned support is prepared and suitably aged, it is brought into contact with a titanium compound. In certain preferred embodiments titanium halides or alkoxides, or combinations thereof, may be selected. Conditions may include a temperature within the range from 0° C. to 50° C., or alternatively, from 25° C. to 35° C.; a time from 3 hours to 24 hours, or alternatively, from 6 hours to 12 hours; or both. The result of this step is adsorption of at least a portion of the titanium compound onto the conditioned magnesium halide support.

Additional Steps in Preparing Multi-metal Catalyst Used to Make the Inventive Polyethylene Compositions For those catalysts used to make the inventive polyethylene compositions, i.e. multi-metal catalysts herein, two additional metals, referred to herein as "the second metal" and "the third metal" for convenience, will also be adsorbed onto the magnesium based support, The "second metal" and the "third metal" are independently selected from zirconium (Zr), hafnium (Hf), vanadium (V), niobium (Nb), tantalum (Ta), chromium (Cr), molybdenum (Mo), and tungsten (W). These metals may be incorporated in any of a variety of ways known to those skilled in the art, but generally contact between the conditioned magnesium based halide support including titanium and the selected second and third metals, in, e.g., liquid phase such as an appropriate hydrocarbon solvent, will be suitable to ensure deposition of the additional metals to form what may now be referred to as the "procatalyst," which is a multi-metallic procatalyst.

In certain embodiments, the multi-metal procatalyst exhibits a molar ratio of the magnesium to a combination of the titanium and the second and third metals that ranges from 30:1 to 5:1; under conditions sufficient to form a multi-metallic procatalyst. Thus, the overall molar ratio of magnesium to titanium ranges from 8:1 to 80:1.

Once the procatalyst has been formed, it may be used to form a final catalyst by combining it with a cocatalyst consisting of at least one organometallic compound such as an alkyl or haloalkyl of aluminum, an alkylaluminum halide, a Grignard reagent, an alkali metal aluminum hydride, an alkali metal borohydride, an alkali metal hydride, an alkaline earth metal hydride, or the like. The formation of the final catalyst from the reaction of the procatalyst and the organometallic cocatalyst may be carried out in situ, or just prior to entering the polymerization reactor. Thus, the combination of the cocatalyst and the procatalyst may occur under a wide variety of conditions. Such conditions may include, for example, contacting them under an inert atmosphere such as nitrogen, argon or other inert gas at temperatures in the range from 0° C. to 250° C., or alternatively, from 15° C. to 200° C. In the preparation of the catalytic reaction product, it is not necessary to separate hydrocarbon soluble components from hydrocarbon insoluble components. Time for contact between the procatalyst and cocatalyst may range, for example, from 0 to 240 seconds, or alternatively, from 5 to 120 seconds. Various combinations of these conditions may be employed.

Catalyst A Preparation

To 800 mL of $MgCl_2$ (0.20 M in ISOPAR™ E) is added $(C_2H_5)AlCl_2$ (48 mL of a 1.0 M solution in hexane). The resulting mixture is allowed to stir overnight at room temperature. A solution of $Ti(OiPr)_4$ (titanium isopropoxide, 48 mL of a 0.25 M solution in ISOPAR™ E) is then added to the magnesium/aluminum suspension. The resulting mixture is allowed to stir overnight to complete the procatalyst aging.

Catalyst 1 Preparation

To approximately 109 kg of 0.20 M $MgCl_2$ slurry was added 7.76 kg of EADC solution (15 wt % in heptanes), followed by agitation for 8 hours. A mixture of $TiCl_4/VOCl_3$ (85 mL and 146 mL, respectively) was then added, followed by a solution of $Zr(TMHD)_4$ (0.320 kg of a 0.30 M solution in Isopar E). These two additions were performed sequentially within 1 hour of each other. The resulting catalyst premix was aged with agitation for an additional 8 h prior to use.

Each of the catalysts prepared hereinabove is then used to prepare Polyethylene Compositions as described below.

Production of Polyethylene Compositions

Polyethylene compositions used to make the inventive and comparative films were made according to the following process.

All raw materials (ethylene, 1-octene) and the process solvent (an isoparaffinic solvent under the tradename ISOPAR E, which is commercially available from Exxon-Mobil Corporation) are purified with molecular sieves before introduction into the reaction environment. Hydrogen is supplied in pressurized cylinders as a high purity grade and is not further purified. The reactor monomer feed (ethylene) stream is pressurized via a mechanical compressor to a pressure that is above the reaction pressure, e.g. 750 psig. The solvent and comonomer (1-octene) feed is pressurized via a mechanical positive displacement pump to pressure that is above the reaction pressure, e.g. 750 psig. The individual catalyst components are manually batch diluted to specified component concentrations with purified solvent (ISOPAR E) and pressured to a pressure that is above the reaction pressure, e.g. 750 psig. All reaction feed flows are measured with mass flow meters and independently controlled with computer automated valve control systems.

The continuous solution polymerization reactor consists of a liquid full, non-adiabatic, isothermal, circulating, loop. Independent control of all fresh solvent, monomer, comonomer, hydrogen, and catalyst component feeds is possible. The combined solvent, monomer, comonomer and hydrogen feed is temperature controlled to anywhere between 5° C. to 50° C. and typically 40° C. by passing the feed stream through a heat exchanger. The fresh comonomer feed to the polymerization reactor is aligned to add comonomer to the recycle solvent. The total fresh feed to the polymerization reactor is injected into the reactor at two locations roughly with equal reactor volumes between each injection location. The fresh feed is controlled typically with each injector receiving half of the total fresh feed mass flow. The catalyst components are injected into the polymerization reactor through a specially designed injection inlet device and are combined into one mixed procatalyst/cocatalyst feed stream prior to injection into the reactor. The cocatalyst component is fed based on calculated specified molar ratios to the procatalyst component. Immediately following each fresh injection location (either feed or catalyst), the feed streams are mixed with the circulating polymerization reactor contents with Kenics static mixing elements. The contents of the reactor are continuously circulated through heat exchangers responsible for removing much of the heat of reaction and with the temperature of the coolant side responsible for maintaining an isothermal reaction environment at the specified temperature. Circulation around the reactor loop is provided by a screw pump. The effluent from the polymerization reactor (containing solvent, monomer, comonomer, hydrogen, catalyst components, and molten polymer) exits the reactor loop and enters a zone where it is contacted with a deactivating and acid scavenging agent (typically calcium stearate and the accompanying water of hydration) to stop the reaction and scavenge hydrogen chloride. In addition, various additives such as anti-oxidants can be added at this point. The stream then goes through another set of Kenics static mixing elements to evenly disperse the catalyst kill and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then passes through a pressure let down control valve (responsible for maintaining the pressure of the reactor at a specified target). The stream then enters a two stage separation and devolatilization system where the polymer is removed from the solvent, hydrogen, and unreacted monomer and comonomer. Impurities are removed from the recycled stream before entering the reactor again. The separated and devolatilized polymer melt is pumped through a die specially designed for underwater pelletization, cut into uniform solid pellets, dried, and transferred into a hopper. After validation of initial polymer properties, the solid polymer pellets are transferred to storage devices.

The portions removed in the devolatilization step may be recycled or destroyed. For example, most of the solvent is recycled back to the reactor after passing through purification beds. The recycled solvent can still have unreacted co-monomer in it that is fortified with fresh co-monomer prior to re-entry to the reactor. The recycled solvent can still have some hydrogen which is then fortified with fresh hydrogen. Tables 1-3 summarize conditions for polymerization of all experimental runs. Additives used were 1250 ppm Calcium Stearate, 1000 ppm IRGAFOS 168 (which is tris(2,4 di-tert-butylphenyl)phosphite), 250 ppm IRGANOX 1076 (which is octadecyl-3-(3,5-di-tert-butyl-4-hydroxyphenyl)propionate), and 200 ppm IRGANOX 1010 (which is tetrakis(methylene(3,5-di-tert-butyl-4hydroxyhydrocinnamate)). IRGAFOS 168, IRGANOX 1076, and IRGANOX 1010 are commercially available from BASF.

TABLE 1

| REACTOR FEEDS | PE Composition 1 | PE Composition A |
|---|---|---|
| Primary Reactor Feed Temperature (° C.) | 40 | 40 |
| Primary Reactor Total Solvent Flow (lb/hr) | 1,446 | 1,462 |
| Primary Reactor Fresh Ethylene Flow (lb/hr) | 381 | 374 |
| Primary Reactor Total Ethylene Flow (lb/hr) | 393 | 386 |
| Comonomer Type | 1-octene | 1-octene |
| Primary Reactor Fresh Comonomer Flow (lb/hr) | 38 | 40 |
| Primary Reactor Total Comonomer Flow (lb/hr) | 188 | 197 |
| Primary Reactor Feed Solvent/Ethylene Ratio | 3.79 | 3.91 |
| Primary Reactor Fresh Hydrogen Flow (sccm) | 2,275 | 2,401 |
| Primary Reactor Hydrogen mole % | 0.0892 | 0.0955 |

TABLE 2

| REACTION CONDITIONS | PE Composition 1 | PE Composition A |
|---|---|---|
| Primary Reactor Control Temperature (° C.) | 190 | 192 |
| Primary Reactor Pressure (Psig) | 725 | 725 |
| Primary Reactor FTnIR Outlet [C2] (g/L) | 10.1 | 7.9 |
| Primary Reactor $\log_{10}$ Viscosity (log(cP)) | 3.10 | 3.16 |
| Primary Reactor Polymer Concentration (wt %) | 21.9 | 21.8 |
| Primary Reactor Exchanger's Heat Transfer Coefficient (BTU/(hr ft$^2$ ° F.)) | 32 | 33 |
| Primary Reactor Polymer Residence Time (hr) | 0.11 | 0.11 |
| Overall Ethylene conversion by vent (wt %) | 92.1 | 93.8 |

TABLE 3

| CATALYST | PE Composition 1 | PE Composition A |
|---|---|---|
| Primary Reactor Catalyst Type | Catalyst 1 | Catalyst A |
| Primary Reactor Catalyst Flow (lb/hr) | 0.92 | 1.42 |
| Primary Reactor Catalyst Concentration (ppm) | 280 | 500 |
| Primary Reactor Catalyst Efficiency (M lbs Poly/lb Zr) | 1.54 | 0.57 |
| Primary Reactor Catalyst Metal Molecular Weight (g/mol) | 47.9 | 47.9 |
| Primary Reactor Co-Catalyst-1 Molar Ratio | 10.0 | 4.0 |
| Primary Reactor Co-Catalyst-1 Type | TEA* | TEA |
| Primary Reactor Co-Catalyst-1 Flow (lb/hr) | 1.03 | 1.69 |
| Primary Reactor Co-Catalyst-1 Concentration (ppm) | 5,998 | 3999 |

*TEA is tri-ethyl-aluminum.

Table 4 provides certain property data for the polyethylene compositions and Table 5 provides the catalyst metal residual concentrations for the polyethylene compositions.

TABLE 4

| | $I_2$ | $I_{10}/I_2$ | Density (g/cm$^3$) | Mw/Mn |
|---|---|---|---|---|
| PE Composition A | 0.92 | 7.91 | 0.9207 | 3.74 |
| PE Composition 1 | 0.96 | 6.96 | 0.9203 | 3.00 |

TABLE 5

| | Al, ppm | Mg, ppm | Ti, ppm | V, ppm | Hf, ppb | Zr, ppm | Cl, ppm |
|---|---|---|---|---|---|---|---|
| PE Composition A | 7.3 ± 0.3 | 13 ± 1 | 1.7 ± 0.1 | ND @ 0.005 | ND @ 30 | ND @ 0.2 | 37 ± 2 |
| PE Composition 1 | 6.1 ± 0.3 | 12 ± 1 | 0.52 ± 0.05 | 1.12 ± 0.05 | ND @ 30 | 0.56 ± 0.05 | 40 ± 2 |

Production of Films from the Polyethylene Compositions

Monolayer films were produced on an Alpine 7 layer line using 7 extruders (A/B/C/D/E/F/G) and using layer ratios of 15%/14%/14%/14%/14%/14%/15%, wherein the same resin composition is used in each of the seven extruders. The die diameter was 9.87 inches (250 mm), the die gap was 70 mils, the blow up ratio was 2.5, and internal bubble cooling was used along with external bubble cooling. Film samples were collected at a controlled rate of 310 lb/hr which equals to an output rate of 10 lb/hr/inch of die circumference. Comparative Film A was made using PE Composition A and Inventive Film 1 was made using PE Composition 1. Tables 6-7 provide the conditions and equipment settings used to make the Inventive and Comparative Films.

TABLE 6

| Process Parameter | | Comparative Film A | Inventive Film 1 |
|---|---|---|---|
| Line output | lbs/hr | 310 | 310 |
| Frost line height | inch | 34 | 34 |
| External Air | % | 34 | 35 |
| IBC Supply Air | % | 50 | 50 |
| IBC Exhaust | % | 47.3 | 47.1 |

TABLE 6-continued

| | | Comparative Film A | Inventive Film 1 |
|---|---|---|---|
| Screw Speed | | | |
| Extruder1 | RPM | 38.9 | 40.5 |
| Extruder2 | RPM | 34.9 | 36.0 |
| Extruder3 | RPM | 39.1 | 38.8 |
| Extruder4 | RPM | 38.6 | 37.5 |
| Extruder5 | RPM | 38.6 | 38.9 |
| Extruder6 | RPM | 37.9 | 36.6 |
| Extruder7 | RPM | 39.7 | 40.6 |

TABLE 7

| | | Comparative Film A | Inventive Film 1 |
|---|---|---|---|
| Melt Temperature | | | |
| Extruder1 | °F. | 456 | 458 |
| Extruder2 | °F. | 457 | 456 |
| Extruder3 | °F. | 463 | 466 |
| Extruder4 | °F. | 449 | 450 |
| Extruder5 | °F. | 448 | 448 |
| Extruder6 | °F. | 460 | 461 |
| Extruder7 | °F. | 445 | 445 |
| Temp. Profile for all extruders | | | |
| Groove feed zone | °F. | 70 | 70 |
| Zone1 | °F. | 350 | 350 |
| Zone2 | °F. | 350 | 350 |
| Zone3 | °F. | 350 | 350 |
| Zone4 | °F. | 350 | 350 |
| Zone5 | °F. | 350 | 350 |
| Zone6 | °F. | 450 | 450 |
| Zone7 | °F. | 450 | 450 |
| Die Zone1 | °F. | 450 | 450 |
| Die Zone2 | °F. | 450 | 450 |
| Die Zone3 | °F. | 450 | 450 |
| Die Zone4 | °F. | 450 | 450 |
| Die Zone5 | °F. | 450 | 450 |

Selected properties of the monolayer films, Inventive Film 1 and Comparative Film A, are given in Table 8.

TABLE 8

| | Comparative Film A | Inventive Film 1 |
|---|---|---|
| Film Gauge, mil | 2 | 2 |
| Dart Drop Impact [Dart A], g | 400 | 514 |
| 45 deg. Gloss, % | 53.2 | 67.9 |
| Total Haze, % | 13.8 | 9.6 |

The present invention may be embodied in other forms without departing from the spirit and the essential attributes thereof, and, accordingly, reference should be made to the appended claims, rather than to the foregoing specification, as indicating the scope of the invention.

Test Methods

Gel Permeation Chromatography (GPC) number and weight-average molecular weights ($M_n$ and $M_w$, respectively) and molecular weight distribution ($M_w/M_n$) of the polymers are determined by Gel Permeation Chromatography (GPC). The chromatographic system consists of a Polymer Laboratories Model PL-220 high temperature chromatograph with an included refractometer. Data collection is accomplished using PolymerChAR (Valencia, Spain) GPC One software and collection interface. The system is equipped with an on-line solvent degas device from Polymer Laboratories.

The column and carousel compartments are operated at 140° C. The columns used are 3 PL Gel Mixed B 10-micron columns and a 10-micron guard column. The solvent used is 1,2,4-trichlorobenzene. The samples are prepared at a concentration of 0.1 g of polymer in 50 mL of solvent. The chromatographic solvent and the samples preparation solvent contain 200 ppm of butylated hydroxytoluene (BHT). Both solvent sources are nitrogen sparged. The samples are stirred for 2 hours at 160° C. The injection volume used is 200 μL and the flow rate is 1.0 mL/min. Calibration of the GPC column set is performed with a minimum of 20 narrow MWD polystyrene standards with molecular weights ranging from 580 to 8,400,000 g/mol, purchased from Polymer Laboratories (Shropshire, UK) with individual concentrations of 0.5 mg/ml and 0.25 mg/ml for molecular weights greater than 500,000. Data reduction is performed with PolymerChAR GPC One software. The polystyrene standard peak molecular weights are converted to polyethylene molecular weights using the method disclosed in Williams, T., and Ward, I. M., "The Construction of Polyethylene Calibration Curve for Gel Permeation Chromatography Using Polystyrene Fractions", J. Polym. Sci. Polym. Lett., 6, 621 (1968):

$$M_{polyethylene} = A(M_{polystyrene})^B$$

wherein M is the molecular weight, A has a value of 0.4316 and B is equal to 1.0. A $3^{rd}$-order polynomial fit was used for the calibration of Polyethylene equivalent logMW as a function of elution volume. During analysis of individual samples and calibrants, a flowrate marker (decane) was used to correct for minor (<1%) flowrate differences. Polyethylene equivalent molecular weight calculations are performed using PolymerChAR GPC One software Version.

Neutron Activation Method for Metals

Two sets of duplicate samples were prepared by transferring approximately 3.5 grams of the pellets into pre-cleaned 2 dram polyethylene vials. Standards were prepared for each metal tested from their NIST traceable standard solutions (Certi. pure from SPEX) into 2-dram polyethylene vials. They were diluted using milli-Q pure water to 6 ml and the vials were heat-sealed. The samples and standards were then analyzed for these elements, using a Mark I TRIGA nuclear reactor. The reactions and experimental conditions used for these elements are summarized in the table below. The samples were transferred to un-irradiated vials before doing the gamma-spectroscopy. The elemental concentrations were calculated using CANBERRA software and standard comparative technique. ND means Not Detected at the quoted detection limit of the NAA measurement system. Table 9 provides measurement parameters for metals determination.

Dart Drop Impact

Dart drop impact was measured according to ASTM D-1709.

45 Degree Gloss 45 degree gloss was measured according to ASTM D-2457.

Total Haze

Total (overall) haze overall haze was measured according to ASTM D-1003.

TABLE 9

| Elements | Nuclear reaction | Isotope | Half life | Reactor Power | Irradiation Time | Waiting Time | Counting Time | Gamma Energy, keV |
|---|---|---|---|---|---|---|---|---|
| Al | $^{27}$Al(n,γ)$^{28}$Al | $^{28}$Al | 2.24 m | 250 kW | 2 m | 4 m | 4.5 min | 1778.5 |
| Cl | $^{37}$Cl(n,γ)$^{38}$Cl | $^{38}$Cl | 37.2 m | 250 kW | 2 m | 4 m | 4.5 min | 1642.5, 2166.5 |
| Cr | $^{50}$Cr(n,γ)$^{51}$Cr | $^{51}$Cr | 27.7 d | 250 kW | 90 m | 5 h | 1.6 h | 320 |
| Hf | $^{180}$Hf(n,γ)$^{181}$Hf | $^{181}$Hf | 42.4 d | 250 kW | 90 m | 5 h | 1.6 h | 133, 482 |
| Mg | $^{26}$Mg(n,γ)$^{27}$Mg | $^{27}$Mg | 9.46 m | 250 kW | 2 m | 4 m | 4.5 min | 843.8, 1014 |
| Mo | $^{98}$Mo(n,γ)$^{99}$Mo | $^{99}$Mo | 66.0 h | 250 kW | 90 m | 5 h | 1.6 h | 181, 739.7, 141 |
| Nb | $^{93}$Nb(n,γ)$^{94m}$Nb | $^{94m}$Nb | 6.26 m | 250 kW | 2 m | 4 m | 4.5 min | 871 |
| Ta | $^{181}$Ta(n,γ)$^{182}$Ta | $^{182}$Ta | 114.4 d | 250 kW | 90 m | 5 h | 1.6 h | 1121, 1222 |
| Ti | $^{50}$Ti(n,γ)$^{51}$Ti | $^{51}$Ti | 5.76 m | 250 kW | 2 m | 4 m | 4.5 min | 320 |
| W | $^{186}$W(n,γ)$^{187}$W | $^{187}$W | 23.7 h | 250 kW | 90 m | 5 h | 1.6 h | 135, 481 |
| V | $^{51}$V(n,γ)$^{52}$V | $^{52}$V | 3.75 m | 250 kW | 2 m | 4 m | 4.5 min | 1434 |
| Zr | $^{96}$Zr(n,γ)$^{97}$Zr | $^{97}$Zr | 16.91 h | 250 kW | 90 m | 5 h | 1.6 h | 743.4 |

We claim:

1. A film comprising a polyethylene composition which comprises the reaction product of ethylene and optionally one or more alpha olefin comonomers in the presence of a catalyst composition comprising a multi-metallic procatalyst via a solution polymerization process in at least one reactor, wherein said polyethylene composition is characterized by one or more of the following properties:
   (a) a melt index, $I_2$, measured according to ASTM D1238 (2.16 kg at 190° C.), from 0.1 to 5 g/10 min;
   (b) density, measured according to ASTM D-792, from 0.910 to 0.925 g/cc;
   (c) melt flow ratio, $I_{10}/I_2$, wherein $I_{10}$ is measured according to ASTM D1238 (10 kg at 190° C.), from 6 to 7.4; and
   (d) molecular weight distribution, $(M_w/M_n)$ from 2.5 to 3.5;
   wherein said multi-metallic procatalyst is obtained according to a process comprising (a) reacting a hydrocarbon-soluble organomagnesium compound or complex thereof and an active non-metallic or metallic halide to form a magnesium halide support; (b) contacting the magnesium halide support with a conditioning compound containing an element selected from the group consisting of boron, aluminum, gallium, indium and tellurium under conditions sufficient to form a conditioned magnesium halide support; (c) contacting the conditioned magnesium halide support and a compound containing, as a first metal, titanium, to form a supported titanium compound; and (d) contacting the supported titanium compound and a second metal and a third metal independently selected from the group consisting of zirconium, hafnium, vanadium, niobium, tantalum, chromium, molybdenum, and tungsten, provided that the second metal and the third metal are not the same; and further provided that the molar ratio of the magnesium to a combination of the titanium and the second and third metals ranges from 30:1 to 5:1; under conditions sufficient to form a multi-metallic procatalyst, and
   wherein the polyethylene composition comprises greater than or equal to 1 parts by combined weight of at least three metal residues remaining from a multi-metallic catalyst formed from the multi-metallic procatalyst per one million parts of polyethylene composition.

2. The film according to claim 1, wherein the solution polymerization occurs in a single reactor.

3. The film according to claim 1, wherein the solution polymerization occurs in a dual reactor system wherein the same polymer is made in each of the dual reactors.

4. The film according to claim 1, wherein the film is a mono-layer film.

5. The mono-layer film according to claim 4, wherein the film has a thickness from 0.8 to 10 mils.

6. A multi-layer film comprising at least one layer which comprises the film of claim 1.

7. A multilayer film comprising at least one layer which comprises the film of claim 1 having a thickness from 0.3 to 8 mils.

8. The film according to claim 4, wherein when the film has a 2 mil thickness made according to the method described herein, said film is characterized by one or more of the following properties:
   (a) a dart drop impact of at least 450 g, measured according to ASTM D-1709;
   (b) 45 degree gloss greater than 57%, measured according to ASTM D-2547; and
   (c) total haze of no greater than 13%, measured according to ASTM D-1003.

9. An article made from the film according to claim 1.

10. The article according to claim 9, wherein the article is selected from the group consisting of pouches, bags, thermoformed webs and laminates.

* * * * *